(12) United States Patent
Wang

(10) Patent No.: US 6,619,348 B2
(45) Date of Patent: Sep. 16, 2003

(54) ADJUSTABLE AND EXTENDIBLE PLATFORM FOR WORKING TABLE

(76) Inventor: Tian Wang Wang, No. 45, Yi Chang East Road, Taiping City, Taichung Hsien (TW), 411

( * ) Notice: Subject to any disclaimer, the term of this patent is extended or adjusted under 35 U.S.C. 154(b) by 0 days.

(21) Appl. No.: 10/055,080

(22) Filed: Jan. 25, 2002

(65) Prior Publication Data

US 2003/0140985 A1 Jul. 31, 2003

(51) Int. Cl.[7] ............................................... B25H 1/00
(52) U.S. Cl. .................... 144/287; 108/143; 144/286.5
(58) Field of Search ............................ 144/287, 286.5, 144/286.1; 83/477, 477.2, 468.7; 108/143, 90; 269/318

(56) References Cited

U.S. PATENT DOCUMENTS

| 2,937,765 | A | * | 5/1960 | Shank ........................ 108/143 |
|---|---|---|---|---|
| 4,964,450 | A | * | 10/1990 | Hughes et al. ............... 144/287 |
| 5,201,863 | A | * | 4/1993 | Peot ............................ 83/432 |
| 5,379,816 | A | * | 1/1995 | Charlton ..................... 144/287 |
| 5,722,472 | A | * | 3/1998 | Wang ...................... 144/286.1 |
| 6,021,908 | A | * | 2/2000 | Mathews ................. 211/90.02 |
| 6,189,429 | B1 | * | 2/2001 | Liu .............................. 83/477 |
| 6,332,548 | B1 | * | 12/2001 | West et al. ................. 211/175 |

* cited by examiner

*Primary Examiner*—Allen Ostrager
*Assistant Examiner*—Shelley Self
(74) *Attorney, Agent, or Firm*—Charles E. Baxley

(57) ABSTRACT

A platform device for attaching to a working table includes a pair of rails slidably supported on a base, and a plate slidably supported on the rails. The base includes two grooves for slidably receiving the rails. One or more stops are secured on the base, and two end boards secured to the ends of the rails for selectively engaging with the stops and for limiting the movement of the rail relative to the base. One or more blocks are secured to the plate for selectively engaging with either of the end boards and for limiting the movement of the plate relative to the rail.

3 Claims, 6 Drawing Sheets

ADJUSTABLE AND EXTENDIBLE PLATFORM FOR WORKING TABLE

The present invention is related to U.S. patent application Ser. No. 09/906,905, filed Jul. 19, 2001.

BACKGROUND OF THE INVENTION

1. Field of the Invention

The present invention relates to a working table, and more particularly to an adjustable and extendible platform assembly for a working table.

2. Description of the Prior Art

Typical working tables comprise a table provided and supported on top of a foot support or the like for supporting the tool members, and/or the work pieces. Normally, the table includes a solid configuration or area that may not be expanded or extended or adjusted. When the longer or wider work pieces are required to be supported on the table and to be worked or machined by the tool members, the table may not be used for stably supporting the work pieces. Additional support members or devices are further required to be provided and disposed beside the working table for supporting the portions of the work pieces that are extended outward beyond the table. It is inconvenient to prepare and assemble and dispose the additional support members for supporting the work pieces. In addition, it takes a long time to adjust the additional support members to a height equal to that of the table.

The present invention has arisen to mitigate and/or obviate the afore-described disadvantages of the conventional working tables.

SUMMARY OF THE INVENTION

The primary objective of the present invention is to provide an adjustable and extendible platform assembly for attaching to a working table and for being slidable and extendible laterally relative to the working table for supporting the portions of the work pieces that are extended outward beyond the working table.

In accordance with one aspect of the invention, there is provided a platform assembly for attaching to a working table or the like, the platform assembly comprising a base, at least one rail slidably supported on the base, a first limiting means for limiting a movement of the rail relative to the base, a plate slidably supported on the rail, and a second limiting means for limiting a movement of the plate relative to the rail. The plate is slidable and extendible laterally relative to the working table for supporting the portions of the work pieces that are extended outward beyond the working table.

The base includes at least one groove formed therein for slidably receiving the rail. The base includes at least one beam disposed thereon, the groove is formed in the beam for slidably receiving the rail.

The rail includes two ends, the first limiting means includes at least one stop secured on the base, and two end boards secured to the ends of the rail for selectively engaging with the stop.

The second limiting means includes at least one block secured to the plate for selectively engaging with either of the end boards. The block includes a duct formed therein for slidably receiving the rail. The rail is preferably slidably engaged in the duct of the block with a dovetail-and-dovetail slot engagement.

The plate includes two ends each having a panel secured thereto, the panels each includes an opening formed therein for slidably receiving the rail and for guiding the plate to slide along the rail. The rail is slidably engaged in the base with a dovetail-and-dovetail slot engagement.

Further objectives and; advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
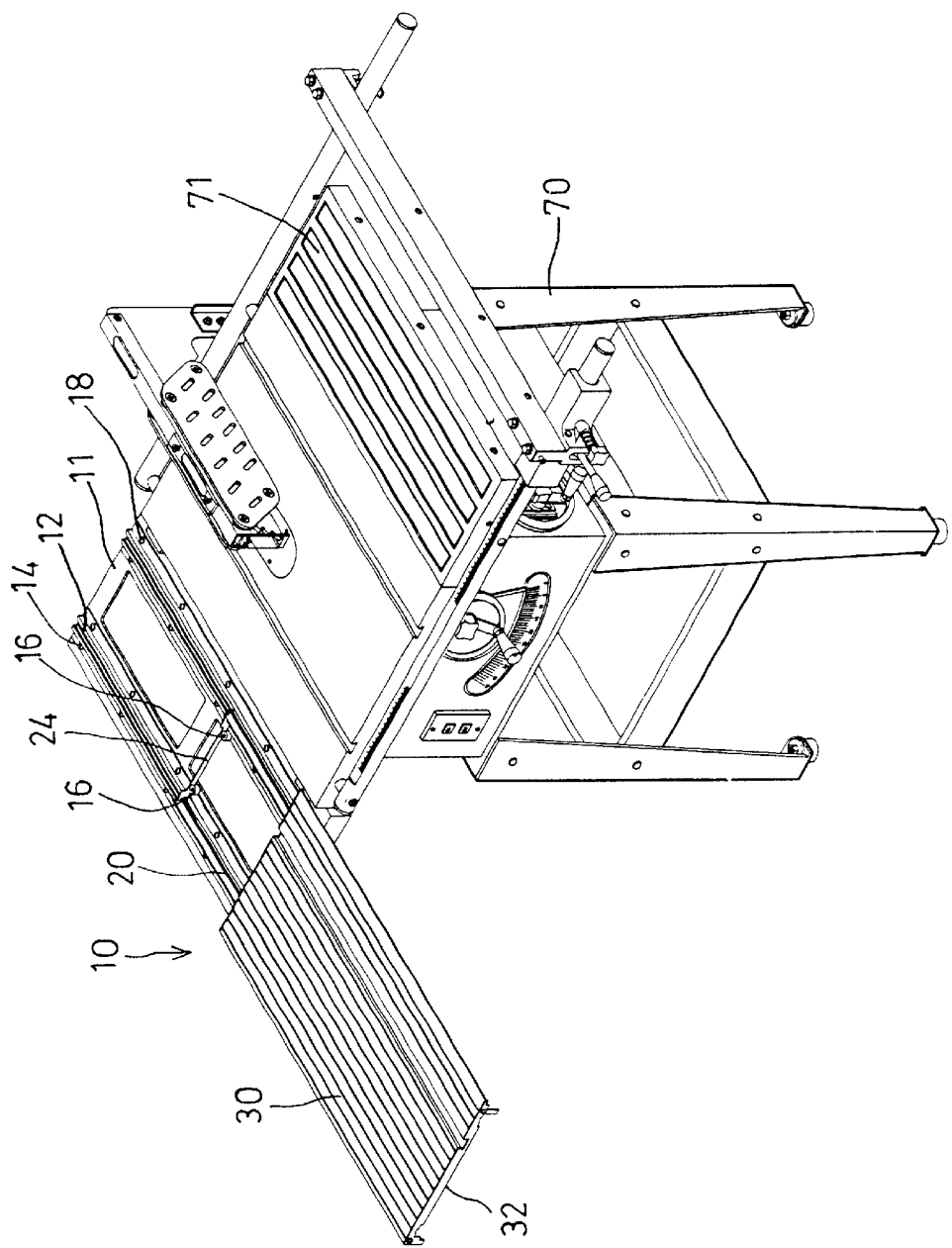
FIG. 1 is a perspective view of a working table having an adjustable and extendible platform assembly in accordance with the present invention.
Figure 2:
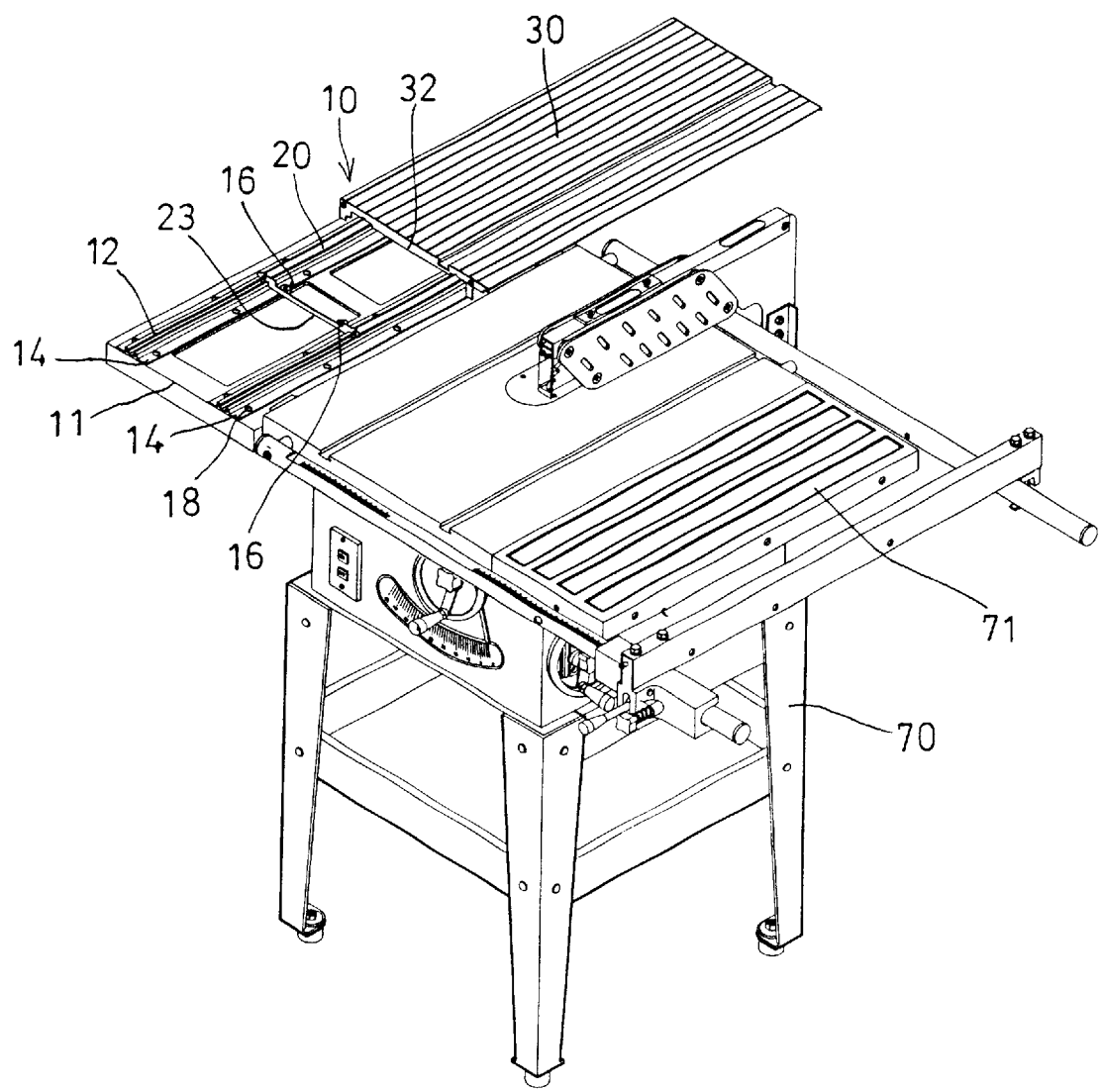
FIG. 2 is a perspective view of the working table, in which the adjustable and extendible platform assembly for the working table has been moved to the opposite side of that shown in FIG. 1.

Referring to the drawings, and initially to FIGS. 1 and 2, an adjustable and extendible platform assembly 10 in accordance with the present invention may be provided for attaching or mounting onto an object, such as a working table which comprises a foot support 70 for being disposed or supported on the ground, for example, and a platform 71 provided on top of the foot support 70, for supporting various kinds of work pieces and/or tool members, such as the table saw blades, etc. The adjustable and extendible platform assembly may be attached or mounted or assembled onto the ends or the sides of the platform 71 for extending laterally or longitudinally away from the platform 71 and for supporting the portions of the work pieces that are extended laterally or longitudinally outward beyond the working table.

Figure 3:
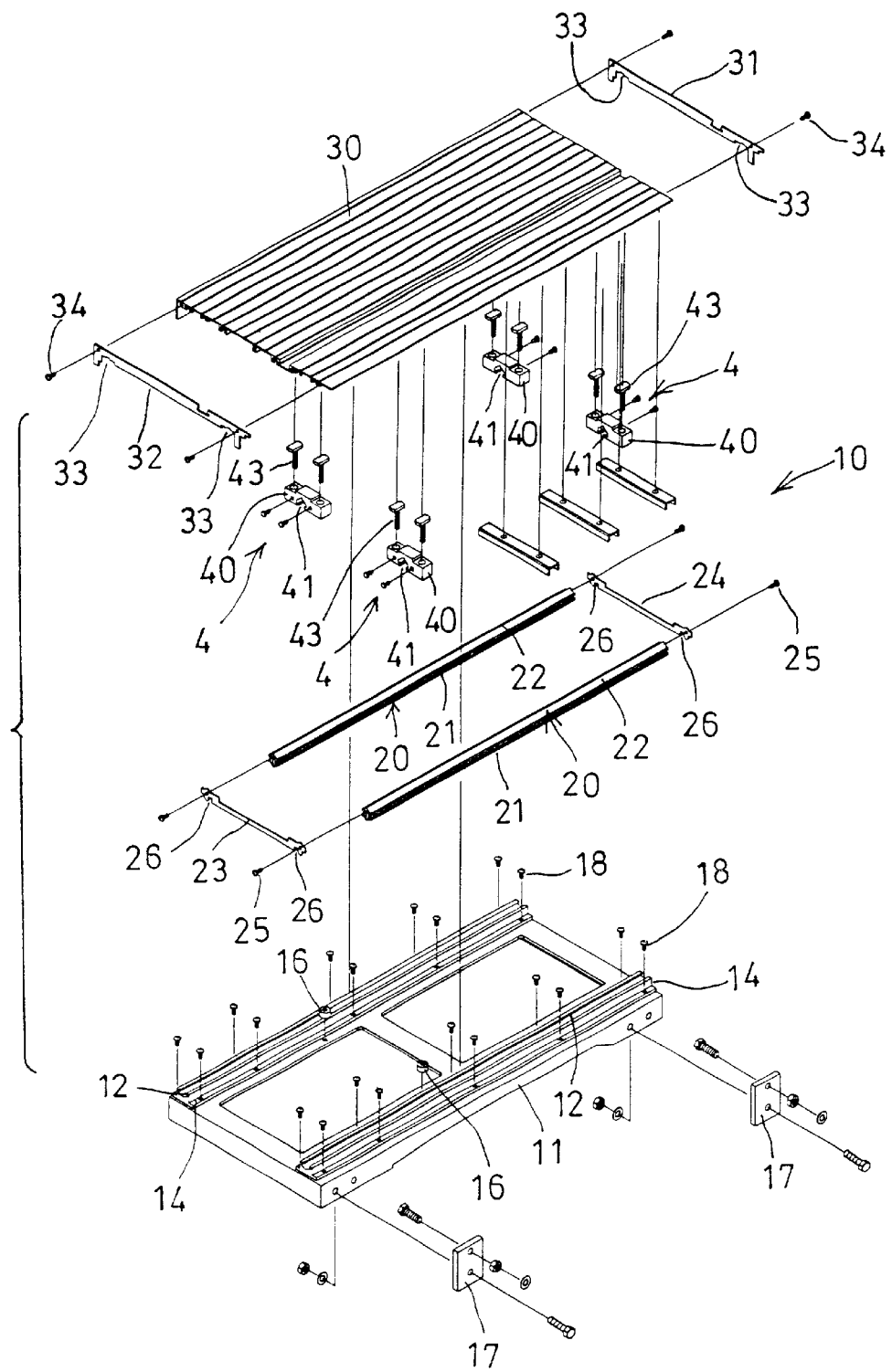
FIG. 3 is an exploded view of the adjustable and extendible platform assembly for the working table.
Figure 4:
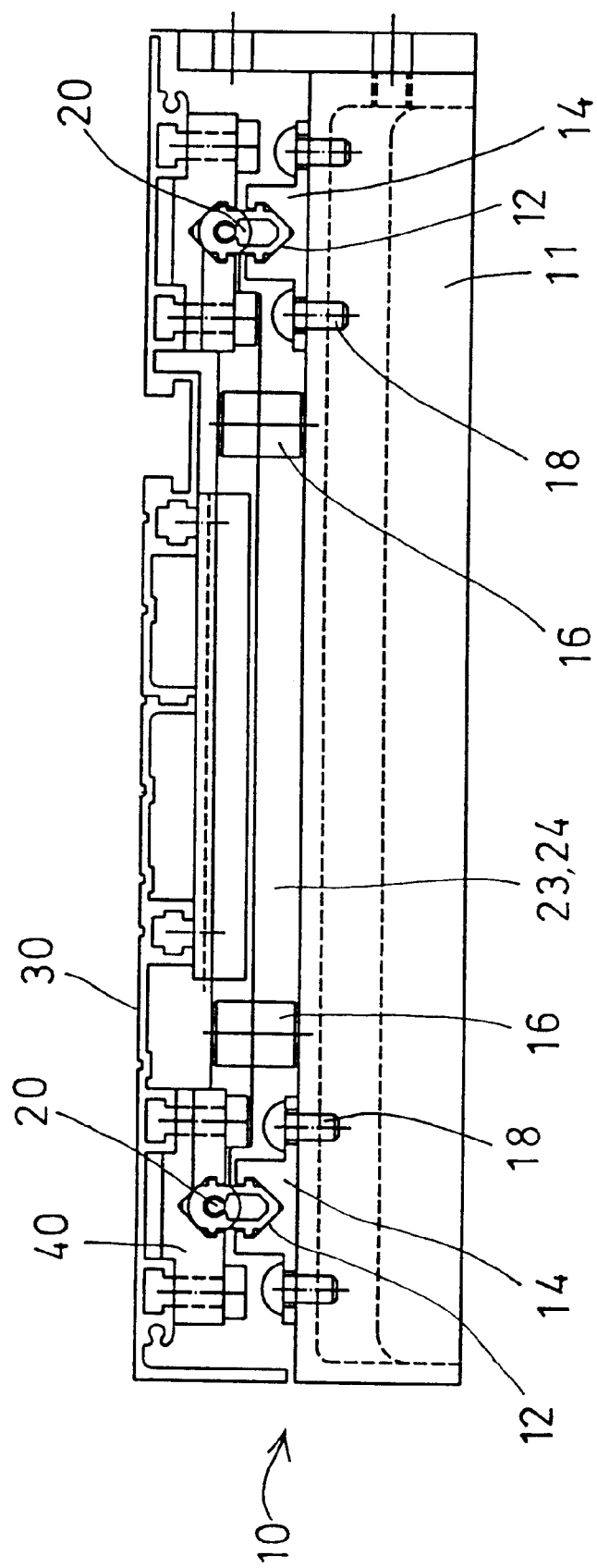
FIG. 4 is an end schematic view of the adjustable and extendible platform assembly.
Figure 5:
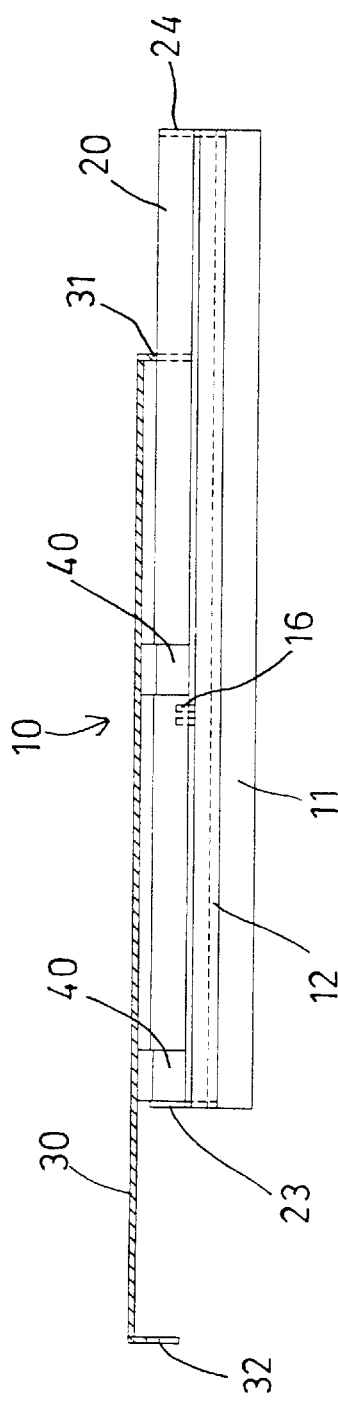
FIGS. 5, 6, 7, 8 are plane schematic views illustrating the operation of the adjustable and extendible platform assembly for the working table.

Referring next to FIGS. 3–5, and again to FIGS. 1 and 2, the adjustable and extendible platform assembly 10 includes a base 11 which may be mounted or assembled onto the ends or the sides of the platform 71 with bars 17 (FIG. 3) or the like. The base 11 includes one or more, such as two grooves 12 formed therein, and parallel to each other, and parallel to the longitudinal axis or direction of the base 11. For example, two beams 14 are disposed and secured on the base 11 with fasteners 18, and have the grooves 12 formed therein respectively. The groves 12 may also be directly formed in the base 11. One or more, such as two stops 16 are secured on the base 11, and arranged beside the beams 14 respectively, and are disposed in the middle portion of the base 11.

One or more, such as two rails 20 each includes a lower track 21 slidably received in the grooves 12 of the base 11 respectively, and each includes an upper track 22 extended outward of the grooves 12 of the beams 14. The lower tracks 21 of the rails 20 are preferably slidably engaged in the respective grooves 12 of the beams 14 with such as a dovetail-and-dovetail slot engagement, for stably guiding the rails 20 to slide along the grooves 12 of the base 11, and for preventing the rails 20 from being disengaged from the grooves 12 of the base 11. Two end boards 23, 24 are secured to the ends of the rails 20 with fasteners 25, and each includes one or more notches 26 formed therein for slidably receiving some portions of the beams 12 and for allowing the end boards 23, 24 to slide along or to slide relative to the beams 14. The end boards 23, 24 are arranged for engaging with the stops 16 (FIGS. 6, 8), in order to limit the relative movement between the rails 20 and the base 11 or the beams 14, and for preventing the rails 20 from being disengaged from the beams 14.

A table plate 30 includes two ends each having a panel 31, 32 secured thereto with fasteners 34 and extended downward from the table plate 30. The panels 31, 32 each includes two openings 33 formed therein for slidably receiving the upper tracks 22 of the rails 20 and for guiding the plate 30 to move or to slide along the rails 20 and the tracks 22. One or more, such as four sliding supports 4 (FIG. 3) each includes a block 40 secured to the bottom of the plate 30, with fasteners 43, for example. The blocks 40 each includes a duct 41 formed therein for slidably receiving the rails 20, and for guiding the blocks 40 and thus the plate 30 to move or to slide along the rails 20. The upper tracks 22 of the rails 20 are preferably slidably engaged in the respective ducts 41 of the blocks 40 with such as a dovetail-and-dovetail slot engagement, for stably guiding the blocks 40 and the plate 30 to slide along the rails 20, and for preventing the blocks 40 and the plate 30 from being disengaged from the rails 20.

Figure 6:
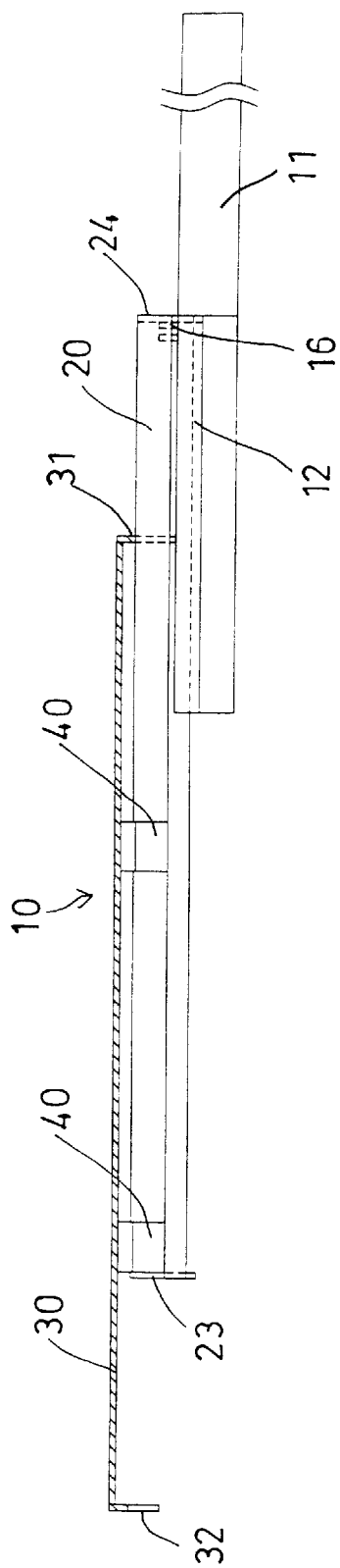

In operation, as shown in FIGS. 1, 5, 6, the plate 30 may be moved leftward beyond the rails 20 until one or more of the left blocks, particularly the leftmost blocks 40 are engaged with the left end board 23 of the rails 20 (FIG. 5). When the leftmost blocks 40 are engaged with the left end board 23, the left end board 23 and thus the rails 20 may be forced to move leftward and outward of the base 11 by the blocks 40, until the right end board 24 is engaged with the stops 16 of the base 11 (FIG. 6). Accordingly, the left block 40 may engage with the left end board 23 to force the rails 20 to move leftward and outward of the base 11. The engagement of the right end board 24 with the stops 16 may limit the leftward movement of the plate 30 and the rails 20 relative to the base 11.

Figure 7:
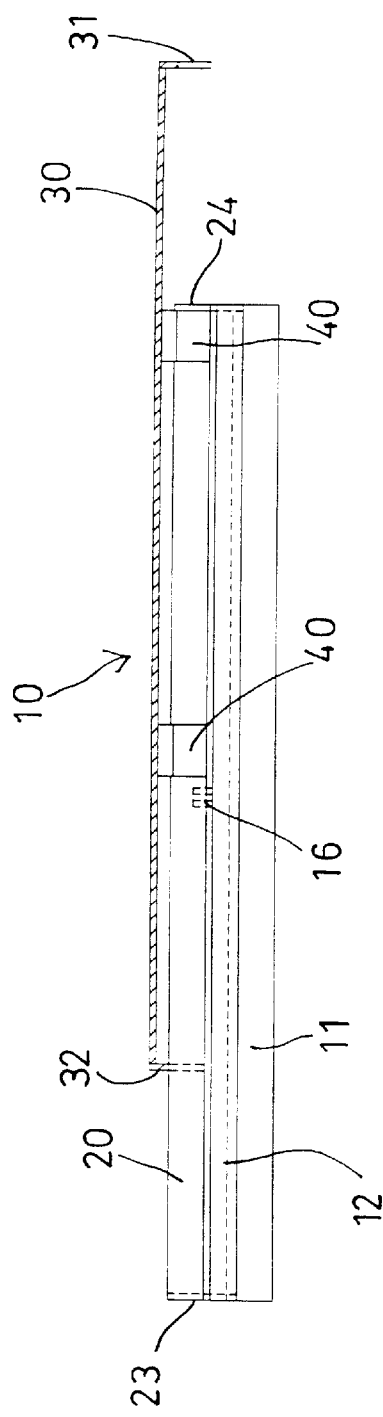
Figure 8:
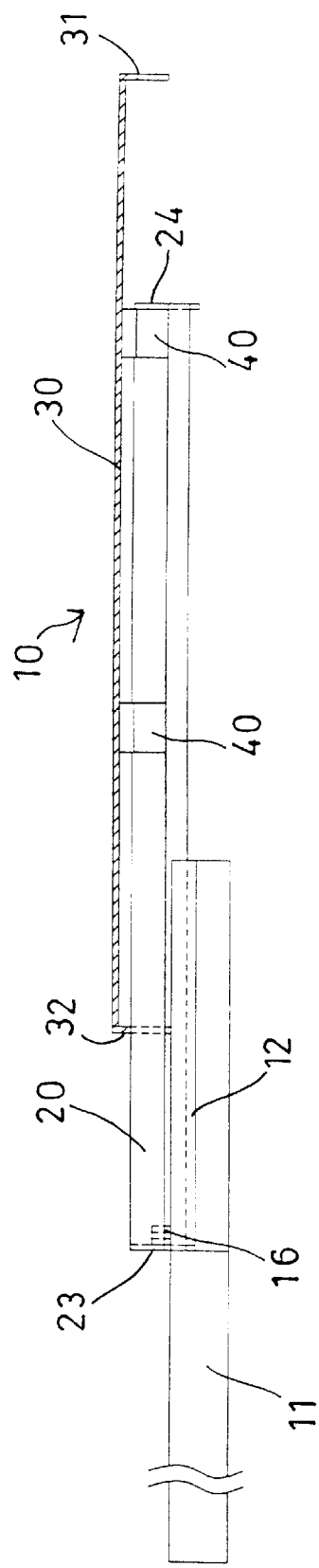

As shown in FIGS. 2, 7, and 8, on the contrary, the plate 30 may be moved rightward beyond the rails 20 until one or more of the right blocks, particularly the rightmost blocks 40 are engaged with the right end board 24 of the rails 20 (FIG. 7). When the rightmost blocks 40 are engaged with the right end board 24, the right end board 24 and thus the rails 20 may be forced to move rightward and outward of the base 11 by the blocks 40, until the left end board 23 is engaged with the stops 16 of the base 11, (FIG. 8). Accordingly, the right block 40 may engage with the right end board 24 to force the rails 20 to move rightward and outward of the base 11. The engagement of the left end board 23 with the stops 16 may limit the rightward movement of the plate 30 and the rails 20 relative to the base 11. The plate 30 may thus be moved rightward (FIG. 2) or leftward (FIG. 1) beyond the base 11 and the platform 71.

It is to be noted that a single block 40 secured to the plate 30 is good enough to engage with the end boards 23, 24 and to limit the relative movement between the plate 30 and the rails 20. However, it is preferable that two or more spaced blocks 40 are provided and attached to the plate 30 for selectively engaging with the end boards 23, 24, and for allowing the plate 30 to be stably supported on the rails 20.

When the base 10 is secured to the platform 71 in the other direction, or in a, direction perpendicular to that shown in FIGS. 1 and 2, the plate 30 may be moved longitudinally away from the platform 71 for supporting longitudinal work pieces. The other lock devices (not shown) may further be provided for locking or positioning the plate 30 to the rails 20 and to the base 11, for allowing the plate 30 and the rails 20 to be positioned at any suitable or selected position relative to the base 11.

Accordingly, the adjustable and extendible platform assembly in accordance with the present invention may be attached to the working table and may be slidable and extendible laterally relative to the working table for supporting the portions of the work pieces that are extended outward beyond the working table.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A platform assembly for attaching to an object, said platform assembly comprising:

a base including at least one beam disposed thereon and at least one groove formed in said at least one beam, a stop disposed on said base, at least one rail slidably received in said at least one groove of said base, and including two ends, two end boards secured to said ends of said at least one rail respectively, to selectively engage with said stop when said at least one rail is slid relative to said base, and a first end board of said two end boards being engageable with said stop to limit a rightward movement of said at least one rail relative to said base, and a second end board of said two end boards being engageable with said stop to limit a leftward movement of said at least one rail relative to said base, a plate slidably supported on said at least one rail, and at least one block secured to said plate, to selectively engage with either of said end boards, and to move said at least one rail either rightward or leftward relative to said base.

2. The platform assembly as claimed in claim 1, wherein said plate includes two ends, and two panels secured to said ends of said plate respectively, said panels each includes an opening formed therein to slidably receive said at least one rail, and to guide said plate to slide along said at least one rail.

3. The platform assembly as claimed in claim 1, wherein said at least one block includes a duct formed therein to slidably receive said at least one rail.

\* \* \* \* \*